Dec. 2, 1958     J. F. BERTSCH     2,862,726
FLUID SUSPENSION CONTROL SYSTEM
Filed April 12, 1957
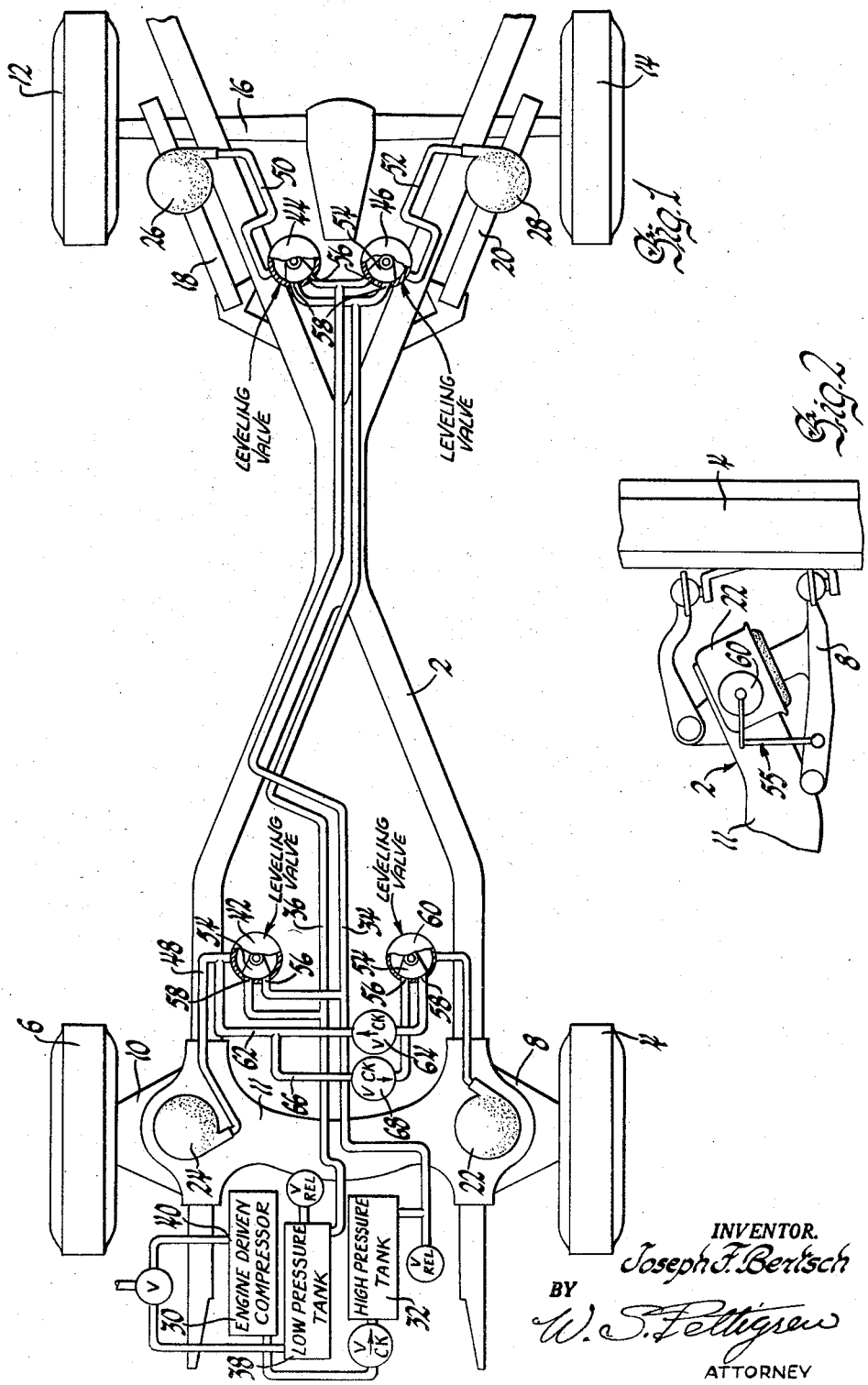
INVENTOR.
Joseph F. Bertsch
BY
W. S. Pettigrew
ATTORNEY United States Patent Office 2,862,726
Patented Dec. 2, 1958

2,862,726

FLUID SUSPENSION CONTROL SYSTEM

Joseph F. Bertsch, Detroit, Mich., assignor to General Motors Corporation, Detroit, Mich., a corporation of Delaware Application April 12, 1957, Serial No. 652,483

9 Claims. (Cl. 280—124)

This invention relates to vehicle suspension systems and more particularly to suspension control apparatus for vehicles equipped with pneumatic or other types of fluid spring.

The use of air or other fluid as the elastic medium in vehicle suspension presents numerous advantages and flexibility of control which are either unattainable or exceptionally difficult to accomplish with other forms of springs. However, the flexibility of control in pneumatic springing carries with it certain problems which are not apparent from superficial consideration. One of the perplexing problems concerns the organization of the valving system utilized in maintaining and controlling the desired quantity of air in each of the air springs.

Inasmuch as virtually all passenger vehicles are of the four-wheel type, air suspension systems are usually organized around a basic four point suspension wherein a separate air spring is disposed between each individual wheel and the adjacent corner of the sprung mass of the vehicle. In order to realize the fullest advantages of air springs, such as maintenance of constant trim height for all loads and partial or complete roll and pitch control, current air suspension systems employ so-called leveling valves which are interposed in the air supply and exhaust system to continuously control the quantity of air confined in the air spring. In the typical system, the position of the leveling valve is governed by linkage or other positive drive mechanism which senses variation in vertical displacement between the sprung and unsprung portions of a vehicle in the area adjacent each of the springs. The position of the leveling valve is, of course, correlated with the direction of displacement so that increased displacement is accompanied by movement of the valve to a position permitting air to exhaust from the spring until the predetermined trim has been regained and conversely upon decreased displacement moves to a position allowing air to enter the spring until the trim height has been restored.

While the prior art contains examples of air suspension including leveling valves of the general type referred to, certain subtle inherent difficulties have not been fully appreciated until recently. Thus, while a separate leveling valve actuated by sensing displacement of each individual wheel presumably affords the maximum degree of trim control, it was not previously appreciated that such a system presented the inherent shortcoming of causing the leveling system to "hunt," due to the fact that four point suspension presents a basically unstable platform. That is, unless the vehicle is resting on a plane surface, only three of the four vehicle wheels can find a common plane. Therefore, the fourth wheel will be either above or below the predetermined displacement required for trim of the vehicle sprung mass. When this condition obtains, the leveling valve associated with the fourth wheel will operate to introduce or exhaust air from its associated spring in an effort to restore the desired displacement. However, in accomplishing this goal, one of the three corners previously located in the common plane will necessarily depart therefrom whereupon the leveling valve associated with the latter wheel will proceed to attempt trim adjustment. Since the effort of the leveling system defies the fundamental principle previously referred to hunting will continue until the air supply is exhausted.

One solution proposed to overcome hunting involves the use of three leveling valves in association with the usual four springs. In a typical example, two of the leveling valves are actuated by sensing displacement of one of each of the rear wheels, while the third leveling valve is actuated by sensing displacement of only one of the two front wheels, but controls the flow of air to both of the front springs. Since trim sensing is confined to three points only, the sprung mass of the vehicle may be quickly oriented to a level position. Although this method adequately defeats the hunting shortcoming inherent in four leveling valve constructions, it introduces the possibility of cross flow of air between the two front springs controlled by the single leveling valve. Since cross flow results primarily from induced pressure differential in the two springs concerned, it will be apparent that any variation from the level trim condition resulting from body roll will tend to aggravate cross flow. Thus, when the vehicle progresses in a path causing a roll condition, lateral weight transfer of the sprung mass will impose greater force on the outboard spring and reduced force on the inboard spring. It, therefore, follows that the pressure in the outboard spring will be greater than the pressure in the inboard spring. Hence, air will tend to flow from the outboard spring to the inboard spring, whereas for effective control in a turn, the direction of cross flow, if any, is preferably opposite.

An object of the present invention is to provide a four point trim sensing air suspension control system for a four wheeled vehicle, the system being so arranged as to prevent hunting when all four wheels are not in a common plane.

Another object is to provide a fluid suspension system including four wheel displacement actuated leveling valves wherein two of the four valves are disposed in the fluid system in parallel and the other two are arranged in series.

A further object of the present invention is to provide a four point fluid suspension for vehicles employing a separate leveling valve for controlling the flow of fluid into and out of each spring, the leveling valves being so constructed and arranged as to eliminate the tendency of the system to hunt when all four wheels are not located on a common plane.

Another object is to provide a four point sensing suspension control system which prevents hunting when the vehicle wheels are not resting on a common plane and which further prevents cross flow of air between laterally adjacent springs when the vehicle sprung mass is in a roll condition.

These and other objects, advantages and features of the invention will become more fully apparent as reference is had to the accompanying specification and drawings wherein:

Fig. 1 is a diagrammatic representation of a vehicle chassis including a fluid supply system and control mechanism for regulating the trim height of the sprung portion of the chassis.

Fig. 2 is an enlarged front elevational view of the left front spring assembly.

In the drawing, the reference numeral 2 designates generally the sprung portion or frame of the vehicle. At laterally opposite sides of the forward portion of the vehicle are front wheels 4 and 6 which are pivotally connected by means of wishbone arms 8 and 10 to the frame cross member 11. Rear wheels 12 and 14 are rotatably supported on a conventional transversely extending axle housing 16 which, in turn, is articulated to the frame by means of rearwardly diverging lever arms 18 and 20. Four air springs designated generally as 22, 24, 26 and 28 are interposed between the frame 2 and one of each of wheel supporting arms 8 and 10 and axle supporting arms 18 and 20 to resiliently suspend frame 2 with respect to the four wheels.

In order to provide a supply of air for springs 22, 24, 26 and 28, there is provided an engine driven compressor 30 which is operative to maintain a high pressure storage tank 32 at a predetermined pressure level. High pressure tank 32, in turn, communicates via high pressure line 34 with each of the springs. Return flow of air from the springs is taken through low pressure line 36 which returns air to low pressure tank 38. Low pressure tank 38, in turn, communicates with the intake side 40 of compressor 30 to provide a supercharged source of dry air which is subsequently compressed and returned to the high pressure tank.

As will be noted in the drawing, the main high pressure and low pressure lines 34 and 36 do not communicate directly with the springs but rather cease as individual lines at leveling valves 42, 44 and 46, each of which communicates via a single supply line 48, 50 and 52 with springs 24, 26 and 28, respectively. Thus, although only one line extends between each of the springs and its associated leveling valve, inflation or deflation of the spring is accurately controlled, since the movable closure 54 of each valve is adapted to allow only alternate opening of the intake ports 56 or the exhaust ports 58. It will be understood that each valve 42, 44, 46 and 60 is mounted on frame 2 and that each valve closure 54 is mechanically actuated by a suitable linkage 55 (Fig. 2) so that angular movement thereof is correlated with rising and falling movement of the wheel relative to the adjacent corner of the frame so that intake port 58 is open when the wheel rises above a predetermined level while the exhaust port 56 is open when the wheel falls below the predetermined level.

In order to overcome the inherent instability of four leveling valve air systems in a four point suspension in accordance with the present invention, the fourth leveling valve 60 is arranged in series communication with leveling valve 42. Thus, although the closure 54 of leveling valve 60 is mechanically actuated by suitable linkage to positions correlated with the rise and fall of front wheel 4, actual intake or exhaust of air from the spring 22 is dependent upon whether the position of closure 54 of leveling valve 42 is compatible with the requirements of spring 22. Since the closure 54 of valve 42 changes position in response to vertical movement of wheel 6, it will be apparent that the only time air may be introduced into or exhausted from springs 22 and 24 simultaneously will be when corresponding vertical displacement of wheels 4 and 6 occurs.

It is also to be noted that although a path exists providing direct communication between the springs 22 and 24, cornering or movement of the vehicle in a sustained curved path does not result in transfer of air from the outboard spring to the inboard spring. Consider, for example, the case of a sustained curved path to the left (assume that wheel 4 is the left front wheel). As the vehicle progresses in the curved path, centrifugal force acting on the sprung mass 2 transfers weight to the right side of the frame imposing a greater pressure on spring 24 and reducing pressure on spring 22. As a consequence of the tilting of the sprung mass, closure 54 of leveling valve 42 is moved clockwise to a position wherein the intake port 56 is open to provide communication with spring 24 and the conduit 62 leading to leveling valve 60. Simultaneously, rising of the left corner of the frame causes closure 54 of leveling valve 60 to be moved clockwise to a position wherein the exhaust port 58 is placed in open communication with spring 22. As the vehicle frame remains in the sustained tilted attitude, air from high pressure tank 32 passes simultaneously into spring 24 and through conduit 62 until arrested by check valve 64. Although an alternate path to valve 60 through conduit 66 exists, the closure 54 of leveling valve 60 blocks port 56 and prevents the flow of air into the valve. Accordingly, no pressure air may pass into spring 22. Conversely, even though closure 54 of leveling valve 60 is in a mechanical position permitting exhaust of air from spring 22, movement of air therefrom is arrested at check valve 64 because the latter is biased to a closed position by the higher pressure exerted thereon by air in line 62. Therefore, during a turn of the described character, additional air will be supplied to the outboard spring 24 to substantially correct the tendency of the frame 2 to tilt downwardly at the outboard side.

In the case of a similar turn, but to the right, the frame portion will tend to tilt downwardly toward the left side of the vehicle so as to depress spring 22 and expand spring 24. Concurrent therewith closure 54 of leveling valve 42 moves counterclockwise to a position permitting exhaust of air from spring 24 and from the line 62 leading to leveling valve 60. However, the depressed condition of the left corner of the vehicle moves the closure 54 of valve 60 counterclockwise to a position opening intake port 56 thereof. Therefore, although no air will be introduced into spring 22 because of the position of leveling valve 42, the check valve 68 in branch line 66 prevents air from exhausting from spring 22 through line 62 and thence into spring 24 or to the main exhaust line 34 through leveling valve 42. It will thus be seen that under conditions of vehicle roll either to the right or to the left, no cross flow between springs 22 and 24 occurs while a substantial degree of correction for the temporary untrimmed attitude of the sprung portion of the vehicle is introduced.

It will be noted that no mention has been made of the operation of leveling valves 44 and 46 coincident with the operation just described. However, since each valve 44 and 46 is adapted for operation correlated only to displacement of the individual wheel with which it is associated, it will be apparent that each will operate to effect changes in spring air pressure tending to correct tilting of the frame 2. It is to be noted, however, that operation of either valve 44 or 46 does not in any way directly affect operation of the other.

As pointed out previously, an outstanding feature of described leveling system is the absence of any hunting tendency when the vehicle is parked on an irregular supporting surface. In order that this feature may be more fully understood, assume, for example, that the vehicle is parked on a surface where wheels 6, 12 and 14 rest on a level surface while wheel 4 is resting on a stone or other obstruction. Under these conditions, the valve closures 54 for each leveling valve 42, 44 and 46 will be oriented to the position shown in solid lines wherein both the intake and exhaust ports 56 and 58, respectively, are simultaneously blocked. Accordingly, air will neither enter nor leave springs 24, 26 and 28. However, closure 54 of valve 60 will be moved counterclockwise to a position opening the intake port 56 thereof due to the elevated position of wheel 4. Although air in spring 22 will be compressed to a higher pressure than the air in spring 24 and line 62, air in spring 22 may not exit therefrom due to the action of check valve 68 in line 66. Similarly, the alternate path afforded through line 62 is blocked by closure 54 engaging exhaust port 58 of leveling valve 60. Obviously, the reverse condition may obtain, namely where wheels 6, 12 and 14 are on a common level while wheel 4 is located in a depression in the road. Under these conditions, the closures 54 for springs 24, 26 and 28 will achieve a position blocking both intake and exhaust ports 56 and 58 whereupon closure 54 of leveling valve 60 will move clockwise to a position opening the exhaust port 58 thereof. However, no air may exhaust from spring 22 through line 62 since check valve 64 will be biased to a closed position by the higher pressure of air in spring 24 acting thereon. It should also be noted that it is not essential that the non-uniform level point be located at wheel 4. This will be quickly evident from consideration of the fact that a common plane always exists with respect to wheels 6, 12 and 14, regardless of the irregularities of the terrain. It is only upon introduction of the fourth point of contact that the establishment of a common plane may become physically impossible. Hence, regardless of the orientation of the non-level surface with respect to the wheels, operation of the suspension system will quickly trim the three points of the vehicle controlled by leveling valves which are incapable of defeat, namely those associated with leveling valves 42, 44 and 46. Thereafter the fourth wheel will necessarily be located at the point of non-uniform level and the action of leveling valve 60 with respect to spring 22 will thereafter be defeated in the manner just described.

While but one embodiment of the invention has been shown and described, it will be apparent that other changes and modifications may be made therein. It is, therefore, to be understood that it is not intended to limit the invention to the modifications shown, but only by the scope of the claims which follow.

I claim:

1. In a four fluid spring suspension having an independently operable intake and exhaust control device communicating with each spring, a fluid distribution organization comprising a source of fluid under pressure, a receiver for exhausted fluid, a fluid distribution network comprising a main intake line connecting three of said four control devices in parallel with said source of pressure, and a main exhaust line connecting said three devices in parallel with said receiver, and means connecting the fourth control device in series communication with one of the first mentioned three control devices.

2. In a four fluid spring suspension having an independently operable inflation and deflation control device communicating with each spring, a source of fluid under pressure, a receiver for exhausted fluid, a fluid distribution network comprising a main intake line connecting three of said four control devices in parallel with said source of pressure and a main exhaust line connecting said three devices in parallel with said receiver, means connecting the fourth control device in series communication with one of the first mentioned three control devices, said means comprising a branched line connecting said last metioned two valves, and two oppositely biased check valves, one in each of said branches.

3. In a four wheeled vehicle suspension system of the type including a fluid spring disposed between each wheel and the sprung portion of the vehicle adjacent thereto, wherein each spring is provided with an intake and exhaust control valve actuated by variation in clearance height between the sprung and unsprung portion of the corner of the vehicle adjacent the spring under control, the improvement which consists in connecting one of said four control valves in series communication with one of the remaining three valves and the spring controlled thereby and providing check valves between said series connected control valves operative to effect unidirectional flow of fluid through the intake and exhaust side of said one control valve whereby said valve is rendered ineffective whenever the other valve with which it is series connected is in a dissimilar control position.

4. In a vehicle including a resilient suspension comprising four fluid springs, a leveling system for controlling the flow of fluid into and out of each spring to regulate trim height of the vehicle sprung mass, said system comprising a separate control for each spring, each of said controls being actuatable from a neutral inactive position to an intake or exhaust position responsive to variation in vertical displacement between the sprung and unsprung portion of the vehicle adjacent the spring, and means responsive to sustained non-uniform displacement of the four corners of the vehicle for disabling the flow of fluid into or out of only one spring whereby the leveling system may reach a static condition when the remaining three corners of the vehicle are equally displaced.

5. In combination, a four wheeled vehicle, a fluid spring adjacent each corner of the vehicle, a source of fluid under pressure, a fluid distributing network connecting said source with said springs, a separate wheel displacement sensitive fluid control valve interposed in said network between each spring and said source, each of said control valves having a neutral inactive position and two active positions allowing intake or exhaust respectively of fluid into or out of the associated spring to maintain a predetermined vertical clearance between each wheel and the adjacent corner of the vehicle, and means for preventing hunting by said control valves when said four wheels are not located in a common plane, said means comprising the arrangement of three of said control valves in parallel communication with said source and the fourth valve in series communication with one of the first three remaining valves.

6. In a vehicle having four point fluid spring suspension, a source of fluid under pressure, a system for controlling the flow of said fluid into and out of each spring comprising a separate control for each spring, each of said controls being actuated responsive to variation in vertical displacement between the sprung and unsprung portion of the vehicle adjacent the spring, three of said controls being arranged in parallel communication with said source of fluid, the fourth control mechanism being arranged in series communication with one of the three control mechanisms.

7. In combination, a pair of expansible fluid springs, a leveling valve for each spring controlling inflation and deflation thereof, each valve comprising a hollow body having an intake and an exhaust port, a valve closure in each of said valves movable from an inactive position closing both of said ports to active positions respectively opening said intake or said exhaust port, the intake and exhaust ports of one valve communicating respectively with a source of fluid under pressure and a receiver for exhausted fluid, a single fluid conducting line connecting said one valve with one of said springs, the intake and exhaust ports for the other valve communicating concurrently with said single fluid conducting line, and a single fluid conducting line connecting said other valve with the other spring.

8. In combination, a pair of expansible fluid springs, a leveling valve for each spring controlling inflation and deflation thereof, each valve comprising a hollow body having an intake and exhaust port, a valve closure in each of said valves movable from an inactive position closing both of said ports to active positions respectively opening said intake or said exhaust ports, the intake and exhaust port of one valve communicating respectively with a source of fluid under pressure and a receiver for exhausted fluid, a first fluid conducting line connecting said one valve with one of said springs, the intake and exhaust ports for the other valve communicating concurrently with said first fluid conducting line, a second fluid conducting line connecting said other valve with the other spring, and a pair of check valves disposed between said first fluid conducting line and said other leveling valve, one of said check valves being arranged to prevent intake of fluid through the exhaust port of said valve and the other being arranged to prevent exhaust of fluid through the intake port of said valve.

9. In a vehicle suspension having four expansible fluid springs disposed respectively at the four corners of the vehicle between the sprung and unsprung portion thereof, a leveling valve for each spring controlling inflation and deflation thereof, each valve comprising a hollow body having an intake and an exhaust port, a valve closure in each of said valves movable from an inactive centered position closing both of said ports to active positions at opposite sides of said centered position respectively opening said intake or said exhaust port, the intake and exhaust ports of three of said valves communicating directly with a source of fluid under pressure and a receiver for exhausted fluid respectively, conduit means connecting each of said three valves directly with the spring adjacent thereto, the intake and exhaust ports for the fourth valve being connected in communicating relation with one of said last mentioned conduit means, and a pair of check valves disposed between said fourth leveling valve and said last mentioned conduit means effective to prevent intake of fluid through the exhaust port of said fourth valve and exhaust of fluid through the intake port of said fourth leveling valve.

References Cited in the file of this patent

UNITED STATES PATENTS 1,721,732   Hawkins _____ July 23, 1929